United States Patent Office 3,457,491
Patented July 22, 1969

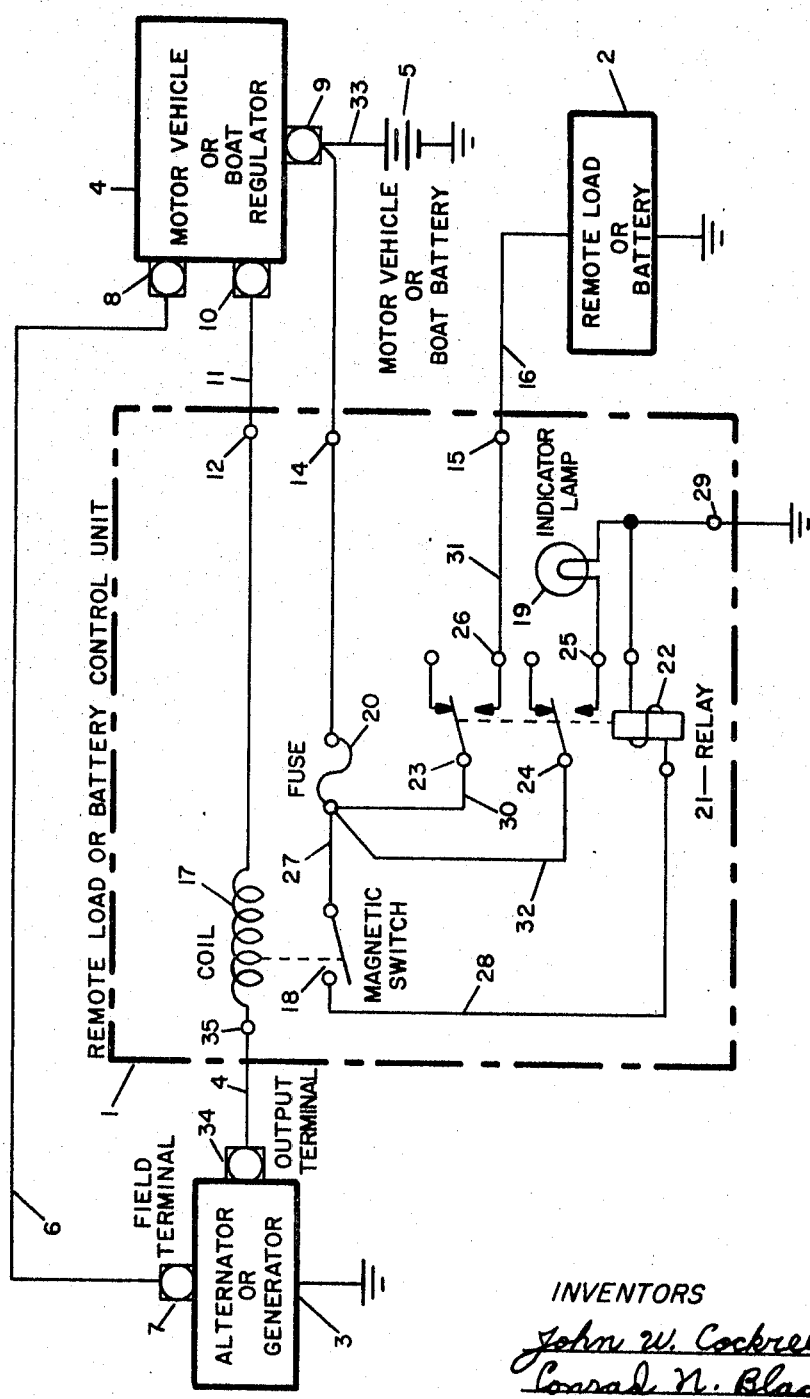

3,457,491
REMOTE LOAD OR BATTERY CONTROL SYSTEM
Conrad Nagel Black, 8692 Belmont St., Cypress, Calif. 90630, and John William Cockrell, Norwalk, Calif. (7407 Bock Ave., Stanton, Calif. 90680)
Filed July 11, 1966, Ser. No. 564,450
Int. Cl. H02j 7/04, 7/16
U.S. Cl. 320—48      2 Claims

ABSTRACT OF THE DISCLOSURE

This circuit comprises a unit which can connect an external load or an external battery to an automobile alternator and regulator. The connection is completed by means of two relays which are energized only when the alternator is supplying current to its own load. The second relay also energizes a lamp to indicate that the external load has been connected.

---

This invention relates to the use of a motor vehicle or boat electrical system to provide a source of power for a remote electrical load or for charging a remote battery.

A primary object is to use the motor vehicle or boat electrical system to automatically control and charge a remote battery which can be used as a power source for a trailer, housecar, or camper electrical system, stationary and portable electrical and electronic equipment, or the like.

A further object of the invention is to provide a novel and improved means for automatic control of the use of a motor vehicle or boat alternator or generator or the like as a source of power for a remote electical load such as a lamp, radio, motor, heater, or the like.

A still further object is to automatically isolate the remote electrical load or battery from the motor vehicle or boat electrical system when the motor vehicle or boat engine is not operating to prevent discharging the motor vehicle or boat battery.

Still, another object is to provide a visual indication that the invention is operating correctly and that there is no overload or short circuit in the remote load or battery circuit.

DESCRIPTION OF THE FIGURE

Referring to the figure, it will be seen that there is illustrated the basic wiring diagram of the invention 1, the remote load or battery 2 which it controls and the necessary portion 3, 4, and 5 of a conventional motor vehicle or boat electrical system which is necessary to show the operation of the invention. The conventional system includes a generator or alternator 3 and regulator 4 of a motor vehicle or boat which are connected by wire 6 from the field terminal 7 or the alternator or generator 3 to terminal 8 of the regulator 4. The conventional system also includes a battery 5 which is connected by wire 33 from the ungrounded terminal of battery 5 to output terminal 9 of the regulator. The output terminal 34 of the alternator or generator 3 would normally be directly connected to terminal 10 of the regulator 4 in a conventional motor vehicle or boat electrical system. However, the invention 1 is connected in series between these terminals 34 and 10 by wire 4 from terminal 3 of the alternator or generator 3 to terminal 35 of the invention 1 and by wire 11 from terminal 10 of the regulator 4 to terminal 12 of the invention 1. An additional wire 13 is connected between the output terminal 9 of the motor vehicle or boat regulator 4 and terminal 14 of the invention 1. The remote load or battery 2 is connected to terminal 15 of the invention 1 by wire 16.

The invention 1 consists of a wire coil 17 which operates a magnetic switch 18, an indicator lamp 19, a fuse 20, and a relay 21 which consists of a solenoid 22, movable contacts 23 and 24, and stationary contacts 25 and 26.

OPERATION OF THE FIGURE

The figure shows the contacts of the magnetic switch 18 and relay 21 in the normal position before the motor vehicle or boat engine is started.

When the motor vehicle or boat engine is started and the generator or alternator is providing current to the motor vehicle or boat electrical system, the magnetic field of the coil 17 closes the contacts of the magnetic switch 18. The closed contacts of the magnetic switch 18 allow current to flow from the motor vehicle or boat electrical system through wire 13, fuse 20, wire 27, magnetic switch 18, wire 28, solenoid 22 of relay 21, and through terminal 29 to ground. The current flowing through the solenoid 22 of relay 21 causes contacts 23 and 26, and 24 and 25 to close. Closed contacts 23 and 26 allow current to flow from the motor vehicle or boat electrical system through wire 13, fuse 20, wire 30, contacts 23 and 26, wire 31, and wire 16 to the remote load or battery 2. This provides current for the remote load or current for charging the battery. Closed contacts 24 and 25 allow current to flow from the fuse 20 through wire 32, contacts 24 and 25, through indicator lamp 19, and terminal 29 to ground, thus lighting the indicator.

The indicator lamp 19 visually indicates the correct operation of the invention 1 and that the fuse 20 is not burned out. The fuse 20 provides overload protection for the motor vehicle or boat electrical system in the event of a short circuit or overload in the invention 1 and remote load or battery 2 circuit. When the fuse 20 burns out, the invention 1 disconnects the motor vehicle or boat electrical system from the remote load or battery 2.

When the motor vehicle or boat engine is stopped, the generator or alternator 3 stops generating current to the motor vehicle or boat electrical system through the coil 17. The coil 17 will no longer have a magnetic field and the magnetic switch 18 contacts will open. The opened contacts of the magnetic switch 18 stop the flow of current through solenoid 22 of relay 21. Relay contacts 23 and 26, and 24 and 25 will open, stopping the flow of current to the remote load or battery 2 and the indicator lamp 19. Therefore, when the motor vehicle or boat engine is stopped, the remote load or battery 2 is automatically disconnected from the motor vehicle or boat electrical system and is so indicated when the indicator lamp 19 goes out. If at any time the motor vehicle or boat generator or alternator 3 malfunctions, the invention 1 will automatically disconnect the remote load or battery 2 from the motor vehicle or boat electrical system.

What is claimed is:

1. A remote load or battery control unit which is connected in series with the existing wire from the alternator output of a motor vehicle to automatically supply power from the electrical system of said motor vehicle to a remote load or battery, when the engine of said motor vehicle is operating and the alternator is supplying current to the regulator of said motor vehicle and automatically disconnects said remote load or battery from said regulator when said engine is stopped and said alternator stops supplying current to said electrical system; said remote load or battery control unit includes a coil connected in series with the output of the said alternator which produces a magnetic field around said coil when current flows from said alternator through said coil to said regulator of the motor vehicle, a magnetic switch with a normally open contact which is closed by the magnetic field of said coil, a fuse connected by a wire to said regulator provides power to said remote load or battery control unit, a relay consisting of a solenoid is energized when the contact of said magnetic switch closes and a pair of normally open contacts are closed when said solenoid is energized; one set of said contacts provides power from said fuse to an indicator light to indicate correct operation; the other set of said contacts connects power from said fuse through a wire to said remote load or battery; said remote load or battery control unit is a current operated device which connects said remote load or battery to said electrical system of the motor vehicle when said alternator is generating a predetermined current and disconnects said remote load or battery from said electrical system of the motor vehicle when said engine is stopped and said alternator stops supplying current to said regulator of the motor vehicle thereby allowing discharge of said remote battery without discharging the battery of said electrical system.

2. The remote load or battery control unit of claim 1 wherein said fuse disconnects said remote load or battery from the motor vehicle regulator in the event of a short circuit or overload.

References Cited
UNITED STATES PATENTS

| | | | |
|---|---|---|---|
| 3,090,871 | 5/1963 | Gorman | 320—48 X |
| 3,105,910 | 10/1963 | Chambers | 307—49 |
| 3,127,518 | 3/1964 | Pruitt | 307—38 X |
| 3,293,443 | 12/1966 | Burch | 307—38 |
| 2,729,750 | 1/1956 | Draper et al. | 320—15 X |
| 3,242,475 | 3/1966 | Davis | 340—248 |

JOHN F. COUCH, Primary Examiner

S. M. WEINBERG, Assistant Examiner

U.S. Cl. X.R.

307—10; 320—54, 61; 340—248